Oct. 7, 1947.　　　　　　L. D. McNEILL　　　　　　2,428,429
CREAM SEPARATOR
Filed July 8, 1942

Applicant:
L. D. McNeill.
Fetherstonhaugh & Co
Atty's.

Patented Oct. 7, 1947

2,428,429

UNITED STATES PATENT OFFICE 2,428,429

CREAM SEPARATOR

Locksley D. McNeill, Winnipeg, Manitoba, Canada

Application July 8, 1942, Serial No. 450,125

1 Claim. (Cl. 210—51.5)

My invention relates to fluid separators, particularly for the separation of a stratum of fluid which has risen to the surface and separated from fluid of different specific gravity therebeneath while in a vessel, the invention concerning even more particularly the separation of cream from milk which has risen to the top of the bottle in which it is contained, an object of my invention being to provide such a separator which functions by novel and conspicuously simple means to separate cream from (with respect to the first embodiment thereof) a milk bottle of standard shape, the device being inexpensive to manufacture in metal or plastic, easy to clean, and being one which, if made in various sizes, would enable the user to select the percentage of cream desired to be decantered, a selection which is not possible with the "cream bowl" or "cream line" bottle and associated ladle now in extensive use.

A further object of my invention is to provide (in an alternative embodiment) a separator functioning according to the principle of the first embodiment, but being, if anything even more simple and inexpensive to manufacture and to keep clean, this alternative embodiment however being designed for use with a milk bottle of novel shape and characterized by the provision of a cylindrical neck, the dimensions of which will be sufficient to contain all the cream likely to separate from the volume of unseparated milk of which the bottle is capable of holding, this alternative embodiment being also adjustable, if desired, in itself, so that the percentage of cream within the bottle neck, which it is desired to decant, may be varied according to the wishes of the user.

With the above more important objects in view and such other minor objects as may appear as the specification proceeds, my invention consists essentially in the arrangement and construction of parts all as hereinafter more particularly described, reference being had to the accompanying drawings, in which.

In the drawings like characters of reference indicate corresponding parts in the different figures.

Figure 2:
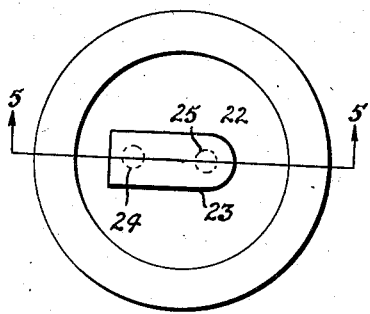
Figure 2 is a full sized plan of the kind of cap which might advantageously be used with one form of my cream separator.

The first embodiment of my invention comprises a hollow cylinder 1 of a diameter slightly less than the inside diameter at the neck line 2 of a milk bottle 3, the cylinder being closed at the lower end thereof by means of the apertured disc 4 or its equivalent.

A projecting flange 5 extends around the upper open end of the cylinder 1, this flange being of a diameter such that it will sit comfortably within the recess 6 which is provided in all conventional milk bottles to receive the standard cardboard closure disc.

A rubber sealing gasket in the form of a ring extends around the cylinder and against the underside of the flange 5, a finger piece in the form of the yoke 8 being provided and secured at its ends to the upper extremities of the cylinder.

Figure 1:
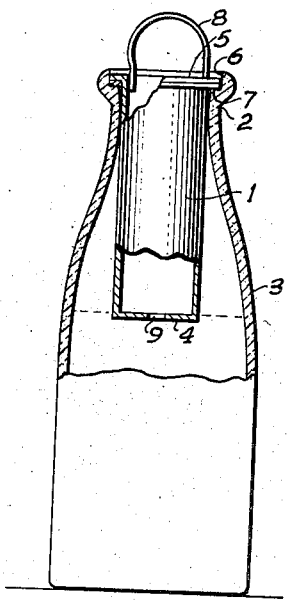
Figure 1 is a side elevation, partly in section illustrating the first embodiment of my separator, in situ within a standard milk bottle.

In using this embodiment, it is to be understood that one merely lowers the cylinder gently and fairly slowly into the body of cream which has stratified off so as to occupy the upper part of the bottle, and as the device is then lowered, the cream rises through the aperture 9, which should preferably be approximately equal to the dimensions shown in Figure 1. Eventually, the separator will come to rest and be suspended in the bottle from the surrounding flange 5 which will rest in the complementary recess 6, subject only to the interposition of the rubber gasket 7.

Decanting of the cream within the cylinder 1 is now effected by tilting the bottle with the separator in it, this is quite conveniently done with one hand while a jug or other receptacle may be held in the other to receive the cream, the bottle being grasped with three fingers and the thumb while the forefinger is pressed downwardly upon the finger piece 8 so as to seal the neck and prevent the escape of fluid outside the cylinder. Some persons may prefer to grasp the bottle by encircling it with the four fingers of the hand and holding the separator in sealed position via the finger piece by exerting enough pressure on the same with the thumb.

Figure 3:
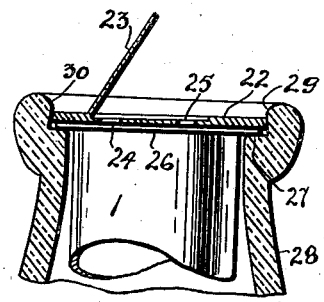
Figure 3 is a section on the line 5—5 of Figure 2.

In Figures 2 and 3 I have illustrated a means whereby a special and novel cardboard closure disc or sealer cap 22 may be utilized in substitution for the finger piece 8 which may be dispensed with, and from the figures in question, it will be seen that I provide, in the upper surface of the disc 22, a lifting tab 23 of substantial length and designed, when in place, to cover and conceal two spaced apertures 24 and 25. It is to be understood that the lifting tab is about half the thickness of the surrounding material of which the disc is formed, and at this point I would explain that lifting tabs of the character herein described, and formed from the surrounding material of the discs are conventional, save and excepting for the fact that they are usually shorter and smaller than the one I propose to employ and are not intended, nor do they, conceal an aperture or apertures therebeneath as in the present arrangement.

With such a disc as is illustrated in Figures 2 and 3, a cream separator of the embodiment illustrated in Figure 1, but without the member 8 may be lowered into a bottle after the disc has been removed. When the separator has sunk to the point where the flange 26 thereof engages the shoulder 27 of the milk bottle, the disc is reinserted as clearly illustrated. If the apertures 24 and 25 are left exposed, tilting of the bottle will permit the cream to run out of one hole, and it is to be understood that the forefinger of the hand grasping the neck 28 of the bottle may be applied against the upper surface of the disc 22 to prevent any possibility of the cream separator from falling out.

I would finally mention in connection with the arrangement just described, that it is unnecessary to use a rubber gasket 7 with this embodiment, since the re-inserted disc will effect a seal around the edge thereof against the rim 29 of the bottle, milk bottle rims being of the configuration illustrated in the accompanying Figure 3 from which it will be seen that the end surface 30 thereof is slightly rounded, thus providing a slight annular constriction helping to retain the disc in place. In the accompanying claim however, it is to be understood that by the word "rim" I intend to refer to the shoulder 27, the rim 29 or the end surface 30.

Since various modifications can be made in my invention as hereinabove described and many apparently widely different embodiments of same made within the scope of the claim without departing from such spirit and scope, it is intended that all matter contained in the accompanying specification shall be interpreted as illustrative only and not in a limiting sense and I desire only such limitations placed thereon as are specifically expressed in the accompanying claim.

What I claim as my invention is:

A separator for facilitating the removal of a predetermined volume of fluid from an open vessel, comprising in combination, a cylinder, an apertured disc closing the lower end of said cylinder, a projecting flange around the upper open end of said cylinder, a sealing gasket ring around said flange, and a finger piece spanning the upper open end of said cylinder, said cylinder being designed for submergence into said fluid, said flange engaging the rim of the opening of said vessel subject to the interposition of said gasket and under pressure by a user on said finger piece to maintain said separator firmly in position upon the tilting of said vessel to decant the contents of said cylinder, without ingress of further fluid thereinto meanwhile.

LOCKSLEY D. McNEILL.

REFERENCES CITED

The following references are of record in the file of this patent:

UNITED STATES PATENTS

| Number | Name | Date |
| --- | --- | --- |
| 1,261,403 | Junk | Apr. 2, 1918 |
| 1,578,389 | Branington | Mar. 30, 1926 |
| 1,742,400 | Larsson | Jan. 7, 1930 |
| 1,960,535 | Grassmueck | May 29, 1934 |
| 1,992,243 | Schnepp et al. | Feb. 26, 1935 |
| 1,473,104 | Jurgensen | Nov. 6, 1923 |
| 1,650,444 | Guyer | Nov. 22, 1927 |
| 2,071,565 | Overmyer | Feb. 23, 1937 |
| 2,100,471 | Covalt | Nov. 30, 1937 |
| 2,222,511 | McAlister | Nov. 19, 1940 |
| 2,224,533 | Bramhall | Dec. 10, 1940 |
| 2,277,001 | Hanson | Mar. 17, 1942 |
| 2,222,594 | Metcalf | Nov. 26, 1940 |
| 1,450,789 | Bender | Apr. 3, 1923 |